United States Patent Office 3,406,082
Patented Oct. 15, 1968

3,406,082
FUMIGATING PRODUCE WITH
HYDRAZOIC ACID
Edwin K. Plant, Pittsburgh, Pa., assignor to PPG Industries, Inc., a corporation of Pennsylvania
No Drawing. Filed July 15, 1965, Ser. No. 472,332
4 Claims. (Cl. 99—225)

ABSTRACT OF THE DISCLOSURE

A method of treating stored raw produce which comprises contacting said produce with hydrazoic acid.

This invention relates to treating stored raw produce. It more particularly relates to the use of $HN_3$ gas as a fumigant and a suppressant of respiration and enzyme activity of stored produce.

It has been found that most of the noxious organic pests which typically degrade produce in storage are effectively controlled by contacting the stored produce with an effective amount of gaseous hydrazoic acid ($HN_3$). In addition, $HN_3$ reduces respiration and enzyme activity of treated produce thereby retarding chemical change and degradation. Hydrazoic acid vapor is useful in the treatment of a wide variety of stored produce, e.g., fruits, such as apples, citrus fruits and berries, vegetables such as beans, peas, soybeans and roots, e.g., potatoes, sweet potatoes, carrots and sugar beets. It is particularly applicable to the fumigation of stored grain, e.g., wheat, corn, barley, rye, oats and rice.

According to a preferred embodiment of the instant invention, hydrazoic acid is introduced as vapor to a storage bin filled, for example, with wheat. The vapors may be introduced at either the top or the bottom of the bin. It is desirable to force the vapors through the bin with a blower or equivalent means.

$HN_3$ may alternatively be introduced as an aqueous solution. The solution is preferably introduced at spaced intervals along with the produce to avoid large accumulations of solution at isolated locations in the storage bin. One effective method of introducing the solution is to allow it to drip gradually into the bin as the grain or other produce is being loaded. Although any solution capable of liberating $HN_3$ vapors is employable, ideal solutions are relatively unsaturated, preferably less than about 20 percent by weight, aqueous solutions of sodium azide and/or potassium azide. Preferably these solutions contain acid in an amount about stoichiometric to the alkaline decomposition products, e.g., NaOH, formed as $HN_3$ is evolved from the solution. Thus, for example, solutions containing about 100 grams of sodium azide and about 56 grams HCl or about 100 grams potassium azide and about 61 grams $H_2SO_4$ per liter of water are representative of the solutions which may be employed.

Because $HN_3$ is highly toxic to the organisms which commonly infest stored raw produce, only limited contact time of the produce by the vapors is required to kill any organic pests infesting the produce. Thus, satisfactory fumigation is normally achieved by introducing to a confined volume, e.g., a storage bin, warehouse, crate, crib, or similar container, of raw produce, a few to about 200 parts per million (p.p.m.) by weight $HN_3$ vapors based on the weight of the produce. Produce piled in the open may be effectively treated by forcing the vapors through the pile. Produce treated in a closed chamber remains uninfested for a long period, often several months. Large excesses of $HN_3$ may safely be employed. The $HN_3$ vapors are readily flushed from the treated produce with air. Repeated treatments are tolerated by the produce. Thus, if the produce is stored for prolonged periods, it may be treated several times as required.

The fumigation techniques described hereinbefore are generally effective in controlling organic pests, such as fungi, bacteria and microorganisms as well as animal and insect pests. These techniques are also useful to protect stored produce from degradation. $HN_3$ vapors are particularly effective in depressing respiration and enzyme activity of stored produce. Thus, for example, sugar beets exposed to $HN_3$ vapors retain a higher sugar content than untreated beets. Sugar beets are conveniently treated by providing $HN_3$ vapors through a duct to the center of a storage pile of the beets. Similarly, sprouting of stored potatoes is retarded by exposing the potatoes to $HN_3$ gas. Best results are attained when the produce is treated in a confined volume. In this way the vapors are held in contact with the produce for a prolonged period.

Although this invention has been described with particular reference to details of certain specific embodiments, it is not intended to thereby limit the scope of the invention to these details except insofar as these details are recited in the appended claims.

I claim:
1. A method of treating stored raw produce which comprises contacting said produce with hydrazoic acid.
2. The method of fumigating raw produce in a confined volume which comprises introducing to said confined volume $HN_3$ vapors.
3. The method of protecting raw produce from degradation which comprises contacting said produce with $HN_3$.
4. The method of treating grain stored in a confined volume to protect it from degradation which comprises introducing to said volume up to about 200 parts per million by weight, based on the weight of the grain, $HN_3$.

References Cited

UNITED STATES PATENTS

| 1,819,399 | 8/1931 | Wesenberg | 167—14 |
| 2,019,121 | 10/1935 | De Rewal | 99—225 |
| 2,254,940 | 9/1941 | Endres | 167—14 X |
| 2,821,483 | 1/1958 | Bonomi | 99—225 |
| 2,875,127 | 2/1959 | Kenaga | 167—39 |
| 3,022,217 | 2/1962 | Roan et al. | 99—225 |

OTHER REFERENCES

C. A., 52: 3244f (1958).
C. A., 54: 18,875a (1960).

MORRIS O. WOLK, *Primary Examiner.*
S. MARANTZ, *Assistant Examiner.*